United States Patent [19]

Akanabe et al.

[11] Patent Number: 5,050,007

[45] Date of Patent: Sep. 17, 1991

[54] IMAGE-SCANNING APPARATUS AND METHOD THEREFOR

[75] Inventors: Yuichi Akanabe, Kunitachi; Masayuki Inai, Ome; Takashi Niu, Yokohama; Tsuyoshi Katsuta, Hachioji; Tatsuya Kaneniwa, Hachioji; Yasuhito Shiraishi, Hachioji, all of Japan

[73] Assignee: Konica Corporation, Tokyo, Japan

[21] Appl. No.: 375,594

[22] Filed: Jul. 5, 1989

[30] Foreign Application Priority Data

Jul. 8, 1988 [JP] Japan ................................. 63-170271

[51] Int. Cl.[5] ............................................. H04N 1/387
[52] U.S. Cl. ..................................... 358/451; 382/46; 358/452
[58] Field of Search ............... 358/451, 450, 452, 453; 382/46

[56] References Cited

U.S. PATENT DOCUMENTS 4,908,874  3/1990  Gabriel .................................. 382/46

Primary Examiner—Edward L. Coles, Sr.
Attorney, Agent, or Firm—Finnegan, Henderson, Farabow, Garrett, and Dunner

[57] ABSTRACT

An image-scanning apparatus for inputting image data to an image processing device. The apparatus includes an image document holding cassette for holding an image document, a document holder stacker for storing the image document holding cassettes therein, and supplying the image document holding cassette into a scanner, the scanner for irradiating the image document located on a document supporting table and inputting the image data from the irradiated image document with an input sensor through a magnification mechanism, the magnification mechanism for changing the magnification of the image document at said input sensor so that the magnification of the image data is changed, and the document supporting table being capable of changing the angle of the image document to the scanner so that the angle of the image data is changed.

17 Claims, 5 Drawing Sheets

FIG. 2
FIG. 3
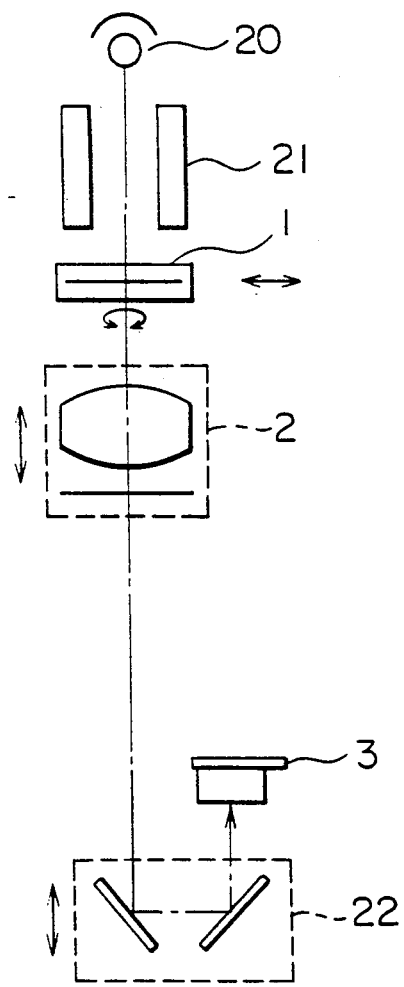
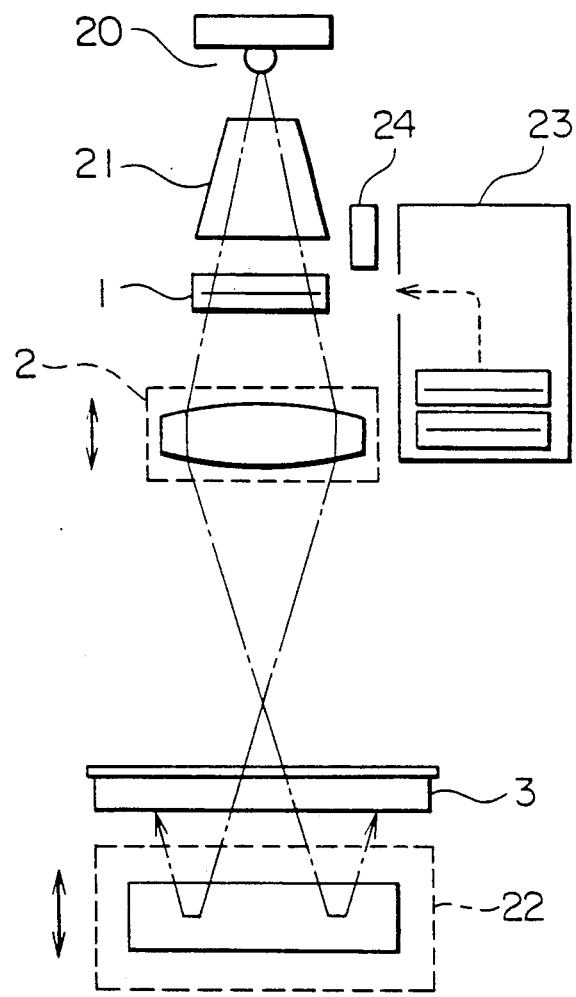

IMAGE-SCANNING APPARATUS AND METHOD THEREFOR

BACKGROUND OF THE INVENTION

1. Field of the Invention

The present invention relates to an image-scanning apparatus and image-scanning method therefor for multi-color photomechanical color printing, and more particularly, to an image-scanning apparatus and an image-scanning method therefor which require a simple operation for accurate image-scanning.

2. Description of the Related Art

In the conventional multi-color photomechanical process, a drum scanner and a magnification-measuring instrument have been used for image-scanning. An image-scanning method employing the aforesaid conventional equipment will be explained below.

An original is fixed on a scanner drum (transparent cylinder) by means of an adhesive tape. After that, the drum is rotated and the original is read by the sensor.

Separately from the above, an image of the original is projected on a layout sheet through a magnification-measuring instrument and thereby the then projection magnification is obtained. Or, the original and the layout sheet are measured by means of a scale for calculating the magnification. The layout sheet, in this case, means the one on which a frame is precisely drawn based on an instruction paper which is given to the photomechanical process for instructing the finished size and layout. A layout sheet mentioned hereinafter includes not only a layout sheet itself but also an original instruction sheet and a copy thereof.

For each of a plurality of originals pasted on the drum, the magnification obtained in the aforesaid way is set from the operation portion for the drum scanner.

When it is necessary to fix an original according to the angle instructed by the layout sheet, the original is positioned relative to the corresponding frame on the layout sheet and an angle formed between the reference line o the layout sheet and one side of the original is measured by the use of a protractor. Or, data of an angle is obtained from a magnification measuring instrument.

When fixing an original on a drum, the original is to be positioned so that an angle formed by a reference line on the drum and a reference side of the original may be the same as the measured angle. Or, the original is to be fixed on the drum after aligning the reference side of the original to the reference line of the measured angle drawn on a transparent sheet.

How to set a highlight and a shadow point of an original will be explained next.

An operator first determines, through the visual check, the highlight portion on the original fixed on the drum, then he turns the drum by hand so that a reading head may coincide with the determined highlight portion, and he measures the density thereof. At the same time, he measures the density on each of a shadow portion and a medium gradation point in the same manner.

The relation between the magnification/angle thus obtained and the original is based on the memory of an operator.

When fixing an original, close attention should be paid not to damage the expensive drum and original. Since the original belongs to a customer, it is not allowed to be damaged.

In order to increase the speed for reading an original, the drum needs to be rotated at high speed, which causes an apparatus to be large in size.

Further, in addition to the drum scanner main body the original needs to be handled by another apparatus for the measurement of magnification, which increases the risk, of damaging the original. Further, because the originals are handled without being covered, the distinction among plural originals is difficult.

For the original requiring the magnification which is extremely different from that of the previous original, it is necessary to change a drum. After fixing an original on the drum, each original requires its own magnification. In that case, there is no way but to rely upon the memory of an operator when ascertaining which measured magnification corresponds to which original, which has increased the probability of an error.

In the measurement of an angle, there has also been a disadvantage similar to that in the aforesaid magnification measurement.

Angle setting is done on a transparent cylinder, but it is difficult to measure an angle on the cylindrical surface, which tends to lower accuracy of measurement. The method employing a transparent sheet is time-consuming and there is a fear that the reading accuracy is adversely affected by the insertion of a sheet.

When setting a highlight and a shadow point, it is necessary to rotate the drum by hand and align a reading head, which is complicated.

The invention has been devised in view of the problems mentioned above, and its object is to realize an image scanning apparatus and method therefor wherein a magnification and an angle may be measured and set through a simple operation, thereby, a plurality of originals can be scanned efficiently.

SUMMARY OF THE INVENTION

An image scanning apparatus of the invention that solves aforesaid problems is characterized in that the image scanning apparatus is provided with an original-holding means capable of changing an original-holding angle for original reading an original-image-reading means capable of changing the magnification for reading originals, an image-storing means capable of storing an original image read by the original-image-reading means, a display means capable of displaying images stored in the image-storing means and an instruction means that instructs the original-holding angle for aforesaid original-holding means and the reading magnification for original reading done by aforesaid original-image-reading means.

An image scanning method that solves aforesaid problems is characterized in that the image scanning method comprises a step wherein an original held in an original-holding means capable of changing the original-holding angle is read by an original-image-reading means at a predetermined magnification and is displayed by a display means, a step wherein an instruction means instructs an angle and a magnification for the main scanning direction for reading the original image displayed by a display means, and a step wherein an original-holding angle for an original-holding means and an original-reading magnification for an original-reading means are set based on the angle and the magnification instructed by the instruction means, and original images are read again. In the invention, therefore, the instruction for reading angle or reading magnification is inputted in the state that images are displayed by a display means after they have been read. After the completion of the input of these instructions, an angle of the original and a reading magnification are adjusted according to the instructions, and then the image scanning is carried out.

BRIEF DESCRIPTION OF THE DRAWINGS

FIGS. 2 and 3 represent a sectional view showing a mechanical constitution of embodiments of the invention.

DETAILED DESCRIPTION OF THE PREFERRED EMBODIMENTS

Figure 1:
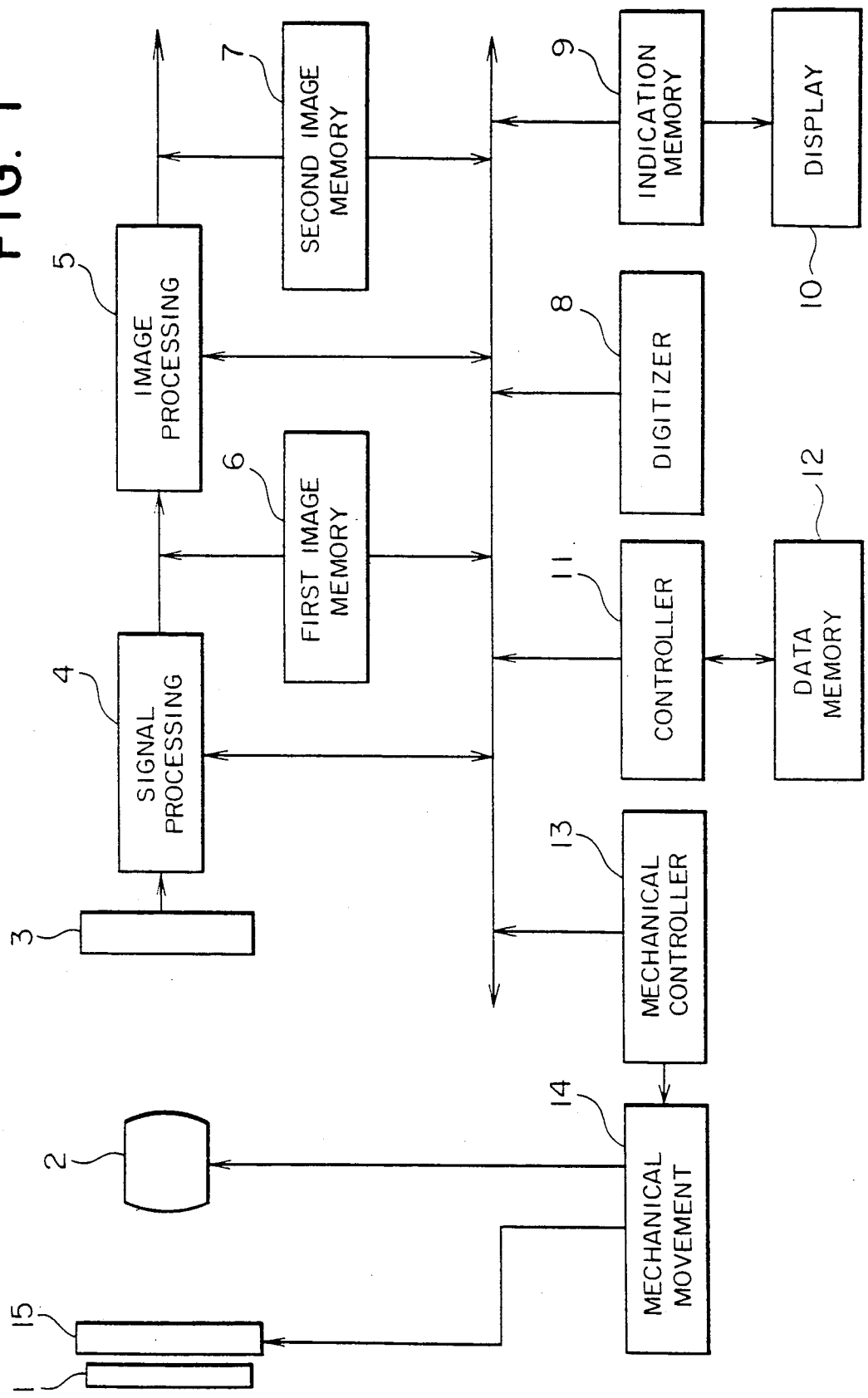
FIG. 1 is a block diagram showing an electrical constitution of an example of the invention.

Examples of the invention will be explained in detail, referring to the drawings.

FIG. 1 is a block diagram showing an electrical constitution of the invention. In the figure, 1 is a cassette wherein originals are loaded, 2 is a lens for forming an image of an original on a line sensor, and 3 is a line sensor that converts an optical image into electrical signals. As line sensor 3, a combination of plural line sensors and filters (or dichroic mirrors) is used. Further, a device of quick switchover between an individual line sensor and a filter, or a line sensor having therein a built-in filter may also be used. The numeral 4 is a signal processing circuit that converts an output from a line sensor 3 into an image signal and performs signal processing such as shading correction and zero level correction. 5 is an image processing circuit that performs image processing necessary for photomechanical process such as color correction (R, G, B →Ye, M, K, Cy), contrast transform and edge enhancement, 6 is No. 1 image memory in which data produced after the aforesaid image processing are stored, 7 is No. 2 image memory capable of storing data produced after the aforesaid image processing, 8 is a digitizer in a flat shape on which the position designation concerning image processing on a computer is conducted by the use of a pointing device, 9 is a display memory that stores data for display, 10 is a display portion where the data stored in display memory 9 are displayed, 11 is a control portion that controls a total apparatus entirely, 12 is a data memory that stores, based on an instruction from control portion 11, the data concerning an original, 13 is a mechanism control section that controls lens and others necessary to be driven mechanically, 14 is a mechanism driving section that drives lens or the like, and 15 is an original stand that holds cassette 1 and turns and transports an original.

FIGS. 2 and 3 represent a sectional view showing a mechanical constitution of the invention. In these figures, items which also appear in FIG. 1 are given numbers which correspond to the same items in FIG. 1 and explanation for them is omitted. In the figures, 20 is a light source that illuminates an original, 21 is a converging unit that converges light from light source 20, 22 is a V-mirror unit that guides the transmitted light from an original to line sensor 3, 23 is a stacker wherein plural cassettes are loaded and each of them is delivered one after another and 24 is a recognizing portion where the number given to each cassette in advance is recognized when that cassette 1 is taken out of stacker 23.

Figure 4:
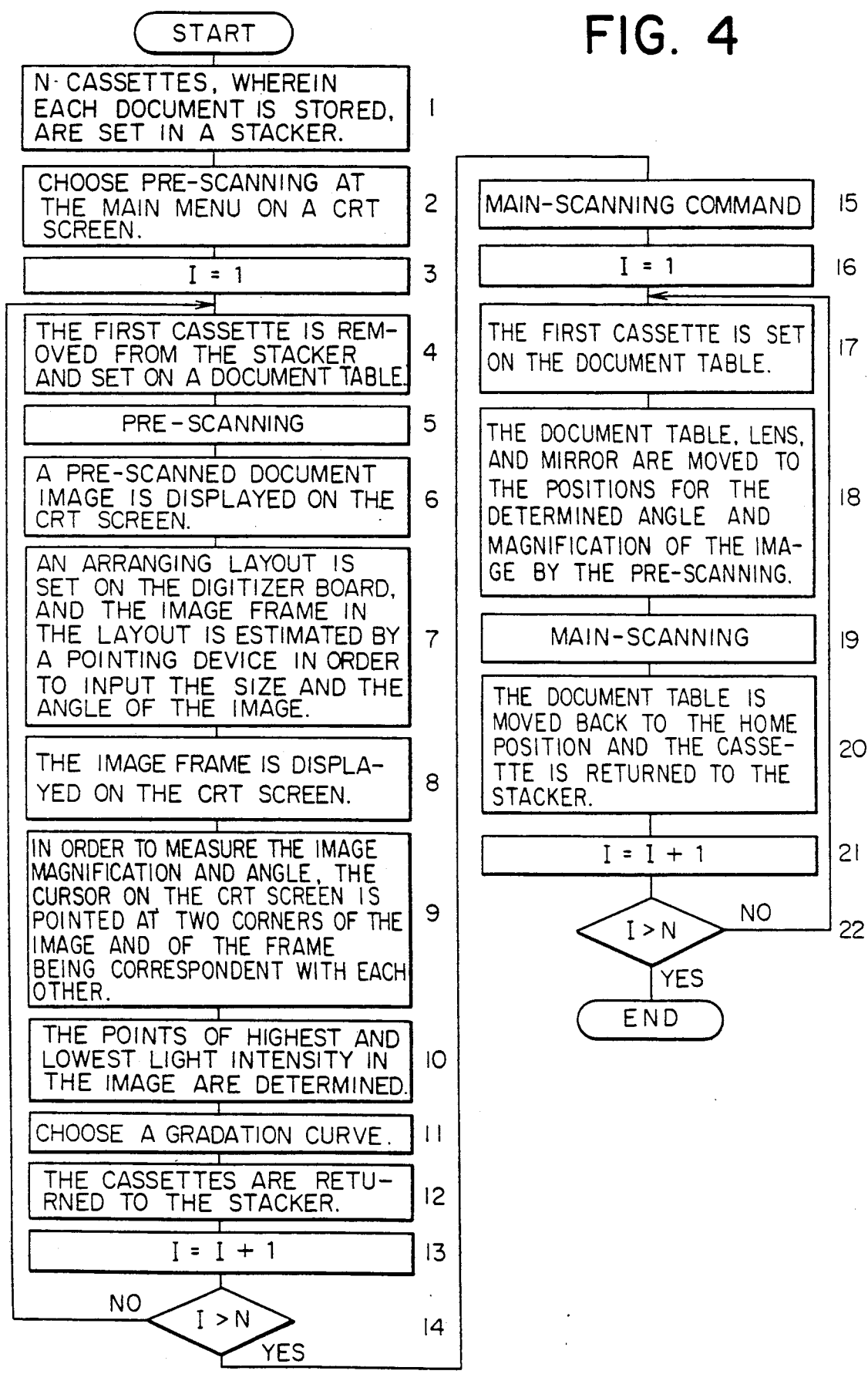
FIG. 4 is a flow chart showing actions of the means of an embodiment of the invention.

FIG. 4 represents a flow chart showing actions of the invention.

Actions of an apparatus of the invention will be explained as follows, referring to FIGS. 1-4.

Figure 5:
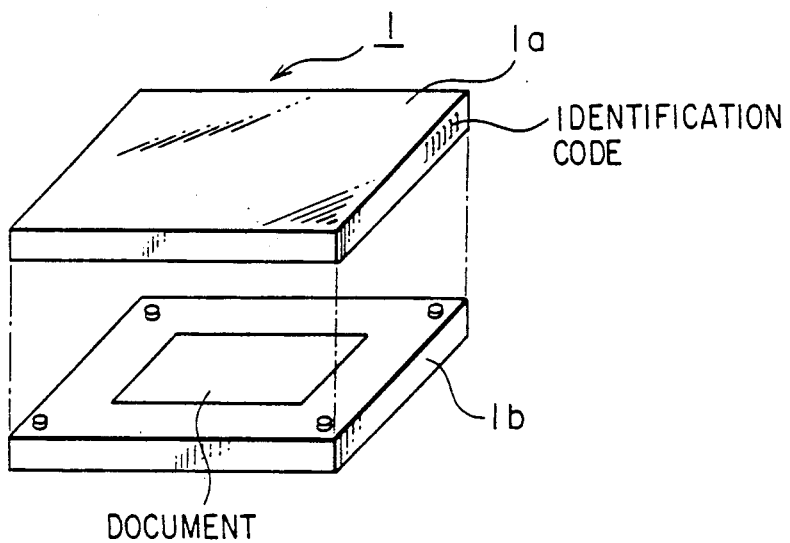
FIG. 5 is a block diagram showing the constitution of a cassette.

Each of originals in the quantity of the sandwiched in a cassette made of transparent material such as acrylic resin or glass. This state is shown in FIG. 5. This cassette is set on stacker 23 {step (1)}. Incidentally, the cassette has its own recognition number such as a bar code allocated in advance, thus, it is possible to recognize plural cassettes (originals).

Now, prescanning among an initial menu on a CRT screen of display portion is selected {step (2)}.

The first cassette 1 ($1 \leq I < N$) is motor-driven and fed into original stand 15 (not shown in FIG. 3) of an apparatus from stacker 23, during the period of which the recognition number of the cassette is read by recognizing portion 24.

Figure 6:
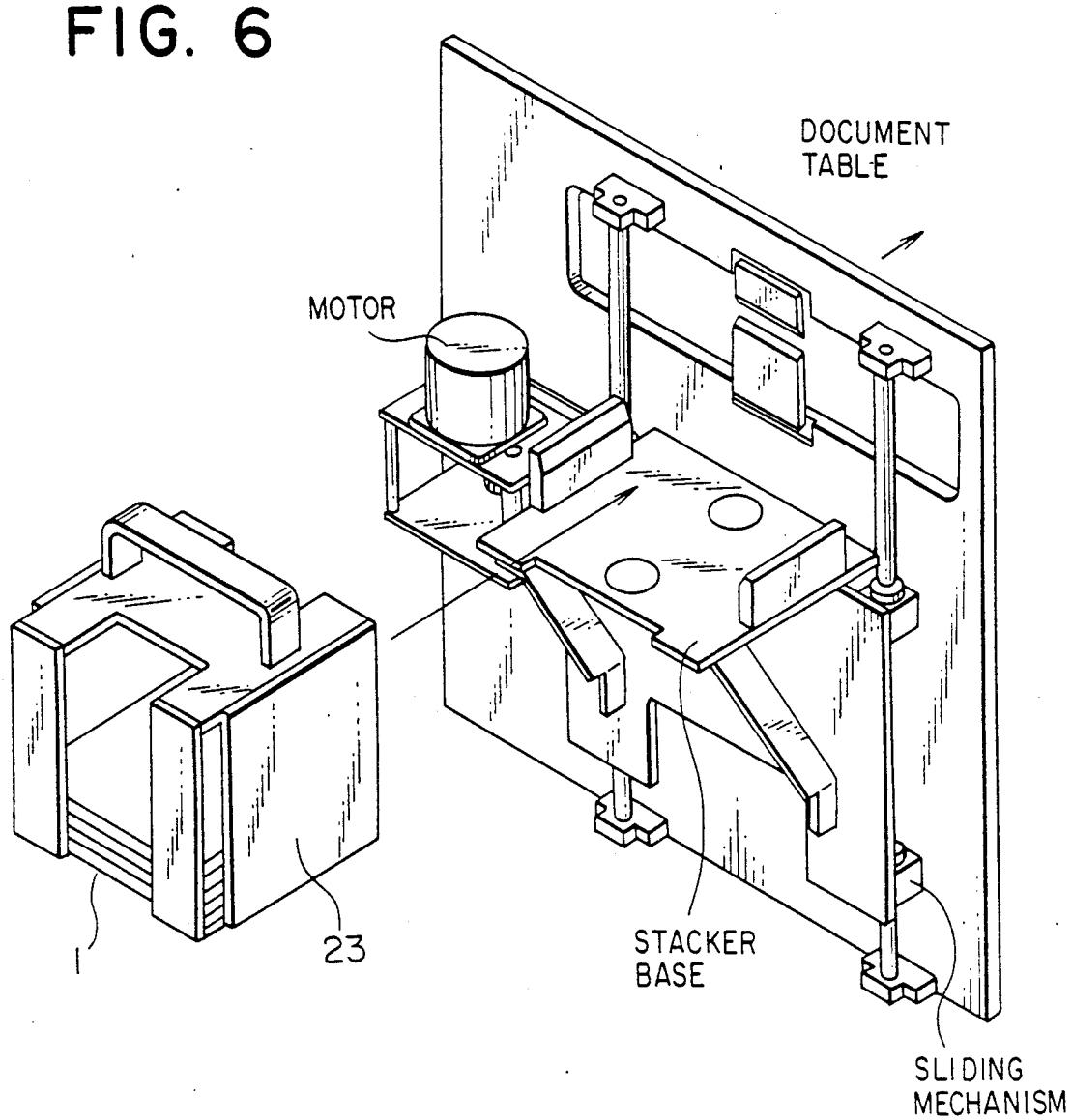
FIG. 6 is a perspective view showing the structure of a primary portion of a stacker and a stacker-driving mechanism.

FIG. 6 is a perspective view showing the key portions of both stacker 23 containing cassette 1 and a driving mechanism for the stacker. Stacker 23 is mounted on a stacker stand which is driven by a motor, and the height of the stacker stand can be adjusted so that a necessary cassette may be taken out. After that, the cassette is pushed out of the rear side of the stacker by means of a push-out mechanism (not shown in the figure) to be fed to original stand 15. Thereby, cassette 1 is held on original stand 15 {step (4)}.

The original stand 15 is equipped with a conveyance device that conveys a cassette toward a constant direction in a plane including an original surface. Here, cassette 1 on original stand 15 is conveyed and images on the original are read by line sensor 3 {prescan: step (5)}. Incidentally, when an original is a transparent one such as a positive film, transmitted light from light source 1 is used as shown in FIG. 2. When an original is a reflection type one such as a color print, light is directed on the original from the side of a lens. For this purpose, a reflection mirror and light converging unit 21 are incorporated in light source 1.

Figure 7:
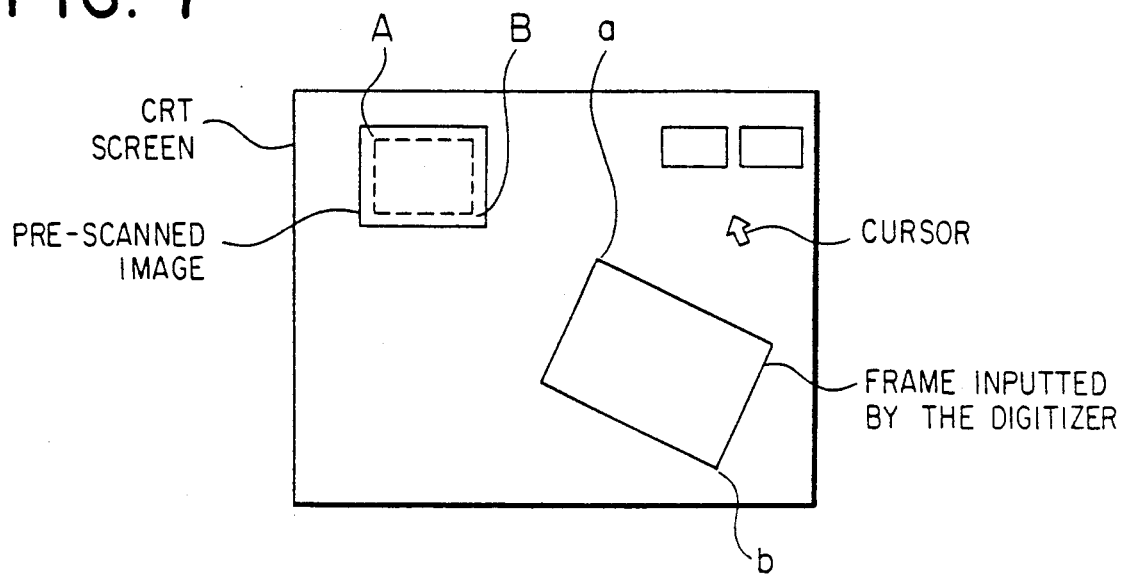
FIGS. 7-9 represent an illustration of a display on a CRT screen appearing for the period of image scanning.

Image data obtained from the original through line sensor 3 are subjected to shading correction and zero level correction in signal processing circuit 4 and then are stored in No. 1 image memory 6. Further, the image data are stored in display memory 9 and displayed on CRT of display portion 10 (step (6)). This is shown in FIG. 7.

The layout sheet on which a layout of photomechanical process is described is fixed on digitizer 8, and a frame covering an image area is designated by the use of a pointing device (step (7)). If the frame is rectangular, three points are designated and if it is a polygon other than a rectangle, locations corresponding, in quantity, to the number of vertexes of the polygon are designated. Thereby, information of frame size to cover images and of an angle are read and then are displayed on CRT {step (8)}.

Next, a cursor on a CRT screen linked with a pointing device points out two points in an image region (points A and B in FIG. 7) and other two points on a frame line (points a and b in FIG. 7), thus, for the direction of an image to be inputted within the frame on the CRT screen, A and B are caused to correspond to a and b respectively. Thereby, when reading an original through the regular scanning, it is possible to obtain a magnification and an angle necessary for inputting images within a frame whose shape, size and angle are designated in advance {step (9)}.

For the measurement of the magnification and angle, the following method may also be used. In that method, so-called designating paper used generally by a designer for instructing the layout for a photomechanical process by drawing illustrations and characters on a full-scale paper equal to a plate in size is placed on a digitizer which is a position-inputting device in a flat shape, and on the CRT screen, on the other hand, only images which have been pre-scanned and are to be inputted are outputted to be formed. Then, two points which are convenient for designating positions within the pattern of the images formed on the designating paper on the digitizer as stated above are selected, and those positions are inputted by means of a pointing device. Also for the same pattern in the images on the CRT screen, two points corresponding to the aforesaid two points on the designating paper are designated by a cursor and thereby are inputted. Thus, it is possible to obtain a magnification and an angle with which the necessary portion in images is framed in the corresponding frame. The values of magnification and angle thus obtained are stored in data memory 12 together with a recognition number of the cassette.

Figure 8:
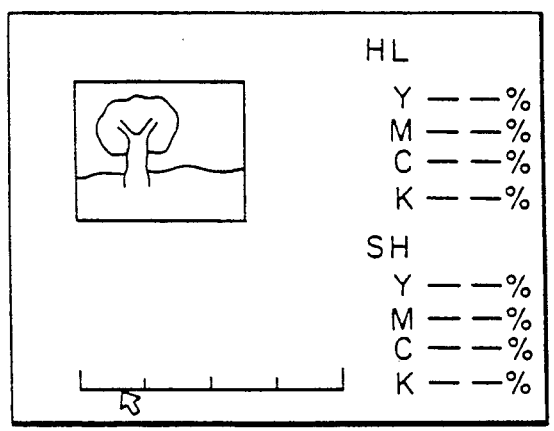

After this, the points of highest and lowest light intensity in the pattern of an original are determined {step (10)}. FIG. 8 represents an illustration showing a display example on the CRT screen where the points of highest and lowest light intensity are determined. At the top on the left side of the screen, there is displayed a read image. When the highest light intensity point of the image is pointed by a cursor, an original density for each of yellow Ye, magenta M and cyan C is indicated. At this point, "dot percentage" of each color is instructed by a scale and a cursor located at the lower portion of the screen so that it may be inputted. Also for the shadow point, the "dot percentage" therefor is inputted in the same way. The "dot percentage" thus obtained is stored in data memory 12 together with a recognition number of a cassette. In the aforesaid manner, the density obtained through pre-scanning is correlated with the "dot percentage". Incidentally, a method other than the above may also be used.

Figure 9:
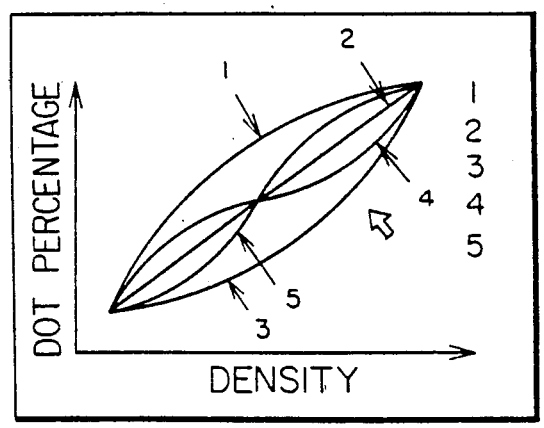

After this, the contrast curve of the image is instructed {step (11)}. FIG. 9 represents an illustration showing a display example on the CRT screen where the contrast curve of the image is instructed. In this example, five types of contrast curves are shown as a basic form, and any one of them can be selected, and the selected contrast curve can further be modified by means of a cursor operation. Further, it is possible to determine the characteristic by pointing intermediate points (one or plural points). The contrast curve thus obtained may be stored in data memory 12 together with a recognition number of the cassette. Through the processing conditions thus obtained, image data stored in No. 1 image memory may be processed by image processing circuit 5 to be stored in No. 2 image memory, and they may further be displayed on display portion 10 through display memory 9.

Now, the cassette is returned to stacker 23 {step (12)}. This prescanning is repeated in succession for all cassettes totaling N pieces.

After pre-scanning is over, regular scanning is selected on the initial menu appearing on the CRT screen (step (15)).

First. No. 1 cassette is fed by motor-powered mechanism from the stacker 23 onto original stand 15 of the apparatus. During this period, the recognition number of the cassette is read by recognizing portion 24. After this, the cassette is held on the original stand 15 {step (17)}. The original stand 15 is equipped with a device capable of rotating the cassette around the axis perpendicular to the original face. In this case, mechanism control section 13 reads out data such as an angle and magnification stored in data memory 12, based on the recognition number of the cassette. Based on the data of angle read out, the mechanism driving section 14 rotates original stand 15. Concurrently with that, positions of both lens 2 and V-mirror unit 22 are adjusted according to the data of magnification so that an optical image may be formed on the line sensor 3 in a preferred size {step (18)}.

The cassette 1 on the original stand 15 is transported and images on the original are read by line sensor 3 {regular scanning: step (19)}. The image data read out by line sensor 3 are subjected to the correction such as shading correction and zero level correction performed by signal processing circuit 4, and to the image processing necessary for photomechanical process such as color correction, contrast transform and edge enhancement performed by image processing circuit 5; and then the image data are outputted as the data of photomechanical process.

After the foregoing, the original stand 15 is returned to its initial state and then the cassette is returned to the stacker 23 {step (20)}.

Aforesaid regular scanning is repeated in succession for all cassettes totaling N pieces. In this case, data of angle and magnification stored in data memory 12 in accordance with the recognition number of each cassette are read out, and based upon such data read out image inputting is carried out. Incidentally, it may be devised so that a part of or whole conditions may be changed in regular scanning. By doing this, it is possible to comply with a special photomechanical process.

Owing to the recognition number, each original is correlated with its input conditions as stated above, and thereby it is not necessary to rely upon the memory of an operator and an extremely simple operation is realized.

In the above explanation, regular scanning is carried out after the completion of prescanning for all cassettes totaling N pieces, which is not the only way. Namely, in another method, pre-scanning may be followed directly by regular scanning for one cassette and the same can be repeated for the next cassette and thereafter. In this way, the total time required for scanning may be shortened. However, when regular scanning is carried out after the pre-scanning for all the cassettes, an operator will not be bothered in regular scanning. Therefore, it is preferable to select based on the actual situation in the job site.

In the above explanation, only one stacker is used for both pre-scanning and regular scanning. However, it is also possible to employ another method wherein pre-scanning is carried out in succession for plural stackers, and after that, the regular scanning is carried out. Further, even if there is an interval in terms of time between pre-scanning and regular scanning (interval time such as one for taking out stacker or for suspension of apparatus operation), it does not cause any problem, because reading conditions are stored in data memory 12. It is also applicable that the regular scanning is started automatically after the completion of pre-scanning has been detected.

Further, it is possible to enhance the job efficiency by using a plurality of image-scanning apparatuses of the invention wherein some of them are for prescanning only and others are for regular scanning only.

Basically, prescanning is carried out with a fixed magnification and a fixed angle. However, it is also possible to carry out prescanning with variable magnification and angle for keeping them as data, and to cause the magnification and angle for the regular scanning to be the ones correlative with those for prescanning.

In the present invention as stated above in detail, prescanning is carried out after its conditions for reading an original are set, and then the image-scanning in accordance with the aforesaid reading conditions is carried out in regular scanning. As a result, it is possible to realize an image-scanning apparatus and method therefor wherein automatic measurement as well as setting of conditions for reading an original may be carried out in a simple operation without damaging the original.

What is claimed is:

1. An image scanning apparatus for inputting image data representing a plurality of documents to an image processing means, comprising:
    a plurality of image document holding means for holding a plurality of corresponding image documents;
    a document holder storing means for storing said plurality of image document holding means therein, and individually transferring each of said image document holding means to a scanning means;
    said scanning means for irradiating an image document located on a document supporting means, and inputting said image data from said irradiated image document with an input means through a magnification means;
    said magnification means for changing the magnification of said image document located on the document supporting means at said input means so that the magnification of said image data is changed; and
    said document supporting means being capable of changing the angle of said image document located on the document supporting means relative to said scanning means so that the angle of said image data is changed.

2. The apparatus claimed in claim 1, wherein each of said image document holding means has an identification code mark provided thereon so that each image document holding means and the image document held therein is identified by said image processing means.

3. The apparatus claimed in claim 2, wherein said input means inputs said image data line by line.

4. The apparatus claimed in claim 3, wherein said image documents are transparent.

5. An apparatus for providing image data representing a plurality of documents to an image processor, comprising:
    a plurality of means for holding the documents, each holding means holding a corresponding document;
    means for individually irradiating each of said documents to produce images representing said documents;
    means for supporting at least one of said plurality of holding means, said supporting means being capable of changing the angle of a document held by said one holding means relative to said irradiating means to change the angular orientation of an image representing the document held by said one holding means;
    means for storing said plurality of holding means;
    means for individually transferring each of said holding means from said storing means to said supporting means;
    means for adjustably magnifying said image representing the document held by said one holding means; and
    means for generating image data in response to said image representing the document held by said one holding means and providing said image data to said image processor.

6. The apparatus claimed in claim 5, wherein each of said plurality of holding means has an identification code mark provided between thereon so that the image processor is capable of identifying each holding means and the document held therein.

7. The apparatus claimed in claim 5, wherein said generating and providing means transmits said image data line by line.

8. The apparatus claimed in claim 5, wherein said documents are transparent.

9. A method for providing image data representing a plurality of documents to an image processor, comprising the steps of:
    providing said documents in a document holder storing means which is capable of storing said plurality of documents;
    generating image data for each of said plurality of documents, the step of generating the image data including the steps of:
        (a) individually conveying said documents from said document holder storing means to an irradiating position; and
        (b) individually irradiating said documents at said irradiating position with a first scanning means to form images representing said documents;
    providing said image data to said image processor and displaying the image data on a display means;
    deriving angle data and magnification data for said images;
    altering the angular orientations and the sizes of said images in accordance with said angle data and said magnification data, respectively;
    generating altered image data in response to said altered images; and
    providing the altered image data to said image processor.

10. The method according to claim 9, wherein said step of generating altered image data includes the steps of:
    individually conveying said documents from said document holder storing means to a second irradiating position;
    positioning said documents at said second irradiating position in order to obtain the altered angular orientations and sizes of said images, and
    individually irradiating said documents with a second scanning means to form said altered images representing said documents.

11. The method according to claim 9, wherein said step of deriving angle data and magnification data includes the steps of:

providing framing data to said image processor and displaying the framing data on the display means;

identifying a plurality of image points on said displayed image data;

identifying a plurality of frame points on said displayed framing data; and determining the changes in the angular orientations and the sizes of the images which are necessary to provide altered image data such that the plurality of image points on the altered image data correspond to the plurality of frame points on the displayed framing data.

12. The method according to claim 9, wherein said step of deriving angle data and magnification data includes the steps of:

identifying a plurality of instruction points on instruction images placed on a dimension input means connected to said image processor;

identifying a plurality of image points on said displayed image data; and determining the changes in the angular orientations and the sizes of the images which are necessary to provide altered image data such that the plurality of image points on the altered image data correspond to the plurality of instruction points on the instruction images.

13. The method according to claim 9, wherein said step of generating altered image data is performed after image data has been generated for all of said plurality of documents.

14. A method for providing image data representing a plurality of documents to an image processor, comprising the steps of:

providing said documents in a document holder storing means which is capable of storing said plurality of documents;

generating image data for each of said plurality of documents, the step of generating image data including the steps of:

(a) individually conveying said documents from said document holder storing means to an irradiating position;

(b) individually irradiating said documents at said irradiating position with a first scanning means to form images representing said documents; and (c) storing first angle data and first magnification data for each of said documents at said irradiating step in a memory means;

providing said image data to said image processor and displaying the image data on a display means;

correlatively deriving second angle data and second magnification data for each of said images in relation to said first angle data and said first magnification data;

altering the angular orientations and the sizes of said images in accordance with said first angle data and said second angle data, and said first magnification data and said second magnification data, respectively;

generating altered image data in response to said altered images; and providing the altered image data to said image processor.

15. The method according to claim 14, wherein said step of generating altered image data includes the steps of:

individually conveying said documents from said document holder storing means to a second irradiating position;

positioning said documents at said second irradiating position in order to obtain the altered angular orientations and sizes of said images, and individually irradiating said documents with a second scanning means to form said altered images representing said documents.

16. The method according to claim 14, wherein said step of generating altered image data is performed after image data has been generated for all of said plurality of documents.

17. A method for providing image data representing a plurality of documents to an image processor, comprising the steps of:

generating image data for each of said plurality of documents by individually irradiating said documents with a scanning means to form images representing said documents;

providing said image data to said image processor and displaying the image data on a display means;

deriving angle data and magnification data for said images;

altering the angular orientations and the sizes of said images in accordance with said angle data and said magnification data, respectively;

generating altered image data in response to said altered images, said step of generating altered image data being performed after image data has been generated for all of said plurality of documents; and providing the altered image data to said image processor.

* * * * *

UNITED STATES PATENT AND TRADEMARK OFFICE
CERTIFICATE OF CORRECTION

PATENT NO. : 5,050,007
DATED : September 17, 1991
INVENTOR(S) : Yuichi Akanabe et al.

It is certified that error appears in the above-identified patent and that said Letters Patent is hereby corrected as shown below:

Title page, item [54] and column 1, lines 1-2 change
"IMAGE-SCANNING APPARATUS AND
METHOD THEREFOR" to --IMAGE SCANNING APPARATUS AND METHOD--.

Abstract, line 1, change "image-scanning"
to --image scanning--.

Claim 6, column 8, line 19, delete "between".

Signed and Sealed this

Twentieth Day of April, 1993

Attest:

MICHAEL K. KIRK

*Attesting Officer*          Acting Commissioner of Patents and Trademarks